United States Patent [19]

Morrison et al.

[11] 4,371,580
[45] Feb. 1, 1983

[54] THREE-PLY BELTING MATERIAL

[75] Inventors: Donald Morrison, Harper; William T. Muma, Jr., Anthony, both of Kans.

[73] Assignee: Morrison Company, Inc., Anthony, Kans.

[21] Appl. No.: 342,812

[22] Filed: Jan. 26, 1982

[51] Int. Cl.³ .............................................. B32B 7/00
[52] U.S. Cl. .................................. 428/250; 198/847; 428/252; 428/258; 428/287; 474/271
[58] Field of Search .............. 428/250, 252, 258, 287; 198/847; 474/264, 271, 268

[56] References Cited
U.S. PATENT DOCUMENTS

| 3,415,700 | 12/1968 | Webster | 198/847 |
| 3,593,840 | 7/1971 | Guyer | 198/847 |
| 4,031,767 | 6/1977 | Guyer | 198/847 |
| 4,094,402 | 6/1978 | Heeke | 428/250 |
| 4,184,589 | 1/1980 | Hobegger | 198/847 |

Primary Examiner—James J. Bell
Attorney, Agent, or Firm—Arnold, White & Durkee

[57] ABSTRACT

Three-ply belting having improved dimensional stability, flexing characteristics, and elongation characteristics is disclosed. The center ply of the belt comprises a first synthetic fabric, while each outer ply comprises a second synthetic fabric. The modulus and flex fatique life of the second synthetic fabric are respectively greater than the modulus and flex fatique life of the first synthetic fabric. Belting in accordance with the present invention is useful in agricultural applications.

13 Claims, 5 Drawing Figures

THREE-PLY BELTING MATERIAL

BACKGROUND OF THE INVENTION

1. Field of the Invention

The present invention relates to belting, and, more particularly, to belting having improved dimensional stability characteristics. Belting in accordance with the present invention is particularly useful in agricultural applications, e.g., in hay balers, where environmental and loading conditions can be severe.

2. Description of the Prior Art

Belting is used today in many types of agricultural machinery, e.g., hay balers. A popular type of hay baler which is marketed today employs a plurality of belts which are used to form the hay into round bales. This type of baler is known as a round hay baler, and the belts which are used on round hay balers are typically on the order of forty feet in length.

There are several factors which must be taken into consideration when designing belting for hay balers. One factor is that, when a hay baler is making bales, the belts are subjected to heavy loads. These loads cause the belts to stretch, and the amount that a belt stretches under load must remain with a certain tolerance or the bale it is making will become too large, which interferes with proper baler operation.

The amount of stretch in belts used on hay balers is not insignificant. For example, a typical maximum specification for elongation of belts for hay balers has been three percent at a specified load. A forty foot belt is thus permitted to stretch up to about fourteen inches under that load. When the belt stretches beyond tolerable limits, the belt is removed and shortened. Shortening of the belt is typically accomplished by trial and error techniques, especially in the field. Such trial and error techniques can produce unsatisfactory results.

Manufacturers of hay balers have continued to increase the specification for the density of bales which a baler can produce. The amount of loading to which the belts of the baler are subjected to make denser bales is increased, and hence the likelihood that a belt will stretch by an amount beyond tolerable limits for proper operation is increased.

Another factor to be considered in belt design is the ability of the belt to flex in operation without the ply material cracking. In that regard, a typical round hay baler employs a plurality of rollers on which the belts are installed. The position of the rollers is such that the belts are subjected to substantial amount of flexing in travelling around the rollers. Moreover, some of the rollers are positioned such that the belts must travel in an S-shape during operation. If the belts fail due to the flexing stress, the belt must be replaced to obtain proper operation of the baler.

Another aspect of the flexing problem is manifested at the location where a belt is spliced. A popular way to connect the ends of a belt is with the so-called "clipper splice" as shown in FIG. 3. The likelihood of belt failure due to flexing is most pronounced at the location in the belt in the vicinity of the clipper splice. This is because the plies of the belts are most prone to crack at the splice.

Yet a third factor which must be considered in belt design is the environment in which the belting is used. Belts used on agricultural equipment are subjected to severe environmental condition, and, in this regard, moisture is perhaps the greatest problem. If the ply material of the belting is deteriorated by moisture, the belt can fail in operation.

It is seen that belting for hay balers need to be dimensionally stable, able to flex without cracking, and not subject to environmental deterioration.

Heretofore, a popular belt which has been used on hay balers is a two-ply belt, wherein the plies are made of a polyamide fabric, e.g., Nylon*. Polyamide fabrics are used in belts for hay balers, inasmuch as they have excellent flexing characteristics and are not as susceptible to moisture deterioration as other types of materials. However, the elongation problems in such belts is pronounced, since a polyamide material has a relatively high elongation modulus and also tends to stretch when wet.

*Nylon is believed to be a registered mark of DuPont.

One proposed solution to the elongation problem in two-ply polyamide belts has been to initially make the belt shorter than required in order to compensate for the elongation. Under this proposed solution, the assumption is that all the belts will stretch in use to the proper length. This approach is not really sound or acceptable, since all belts on the hay baler do not stretch an exact amount. Even though unacceptable, this approach has been utilized in the industry to accept for the elongation problem, and at the present time, the standard of the industry has been two-ply polyamide belting.

There have been other suggestions to solve the elongation or stretching problem in belts. One such suggestion was to make a two-ply belt, where the plies were made of a rayon material. Rayon has a lower elongation modulus than a polyamide fabric, and, hence, does not stretch as much as a polyamide belt under the same load. However, this belt proved to be unacceptable, since rayon is particularly susceptible to moisture attack.

Another suggestion for solving the elongation problem was to make a two-ply belt wherein the plies were made of a polyester material. This proposed solution was ineffective inasmuch as the polyester plies tended to crack when flexed, and the cracking was most pronounced in the area of the clipper splice.

Another type of belting which was used on hay balers included a three-ply belt wherein the center ply was made of polyamide fabric, and wherein the two outer plies were made of cotton. This type of belt failed, inasmuch as moisture caused the cotton to rot and the belt then failed, since it was not able to carry a sufficient load.

No belting has been heretofore available which: (1) exhibits good dimensional stability characteristics; (2) is not subject to deterioration based on environmental conditions; and (3) can withstand the flexing requirements imposed on belts by hay balers.

SUMMARY OF THE INVENTION

In accordance with the present invention, belting is provided which exhibits superior dimensional stability characteristics, which is not subject to deterioration due to environmental conditions, and which is able to flex in operation without cracking.

In accordance with the present invention, three-ply belting material is provided, wherein the center ply comprises a first synthetic fabric and wherein each outer ply comprises a second synthetic fabric. The flex fatique life and modulus of the second synthetic fabric are greater than the respective flex fatigue life and modulus of the first synthetic fabric. The use of fabrics having different elongation moduli reduces the amount that the belt can stretch, since the elongation is controlled by the modulus of the center ply fabric. The use of synthetic fabrics reduces the susceptibility of the belt to moisture deterioration.

A rubber skim is interposed between the center ply and each outer ply, and the thickness of the rubber skims are substantially the same. Thus, in operation, the center line of the load is maintained on the center ply. With this approach, the center ply is not flexed as much as the outer plies, and the likelihood that the center ply will crack is reduced. The outer places have sufficient strength to hold the clipper splice and sufficient flex fatigue life to flex without cracking.

In one embodiment of the present invention, three-ply belting material is provided wherein the center ply comprises a polyester fabric and wherein each outer ply comprises a polyamide fabric. Interposed between the center ply and each outer ply is a rubber skim. Each rubber skim is bonded to the center ply and its respective outer ply, and the thickness of each rubber skim is substantially the same. A rubber cover is bonded to each outer ply to provide abrasion protection for the belt and to give the machinery on which the belt is used a surface to engage when the belt is in operation.

In yet another embodiment of the present invention, each outer ply comprises a sheet of fabric which is woven with polyamide yarns in one direction and polyester yarns in the other direction. The center ply comprises a sheet of polyester fabric. In this embodiment, the belting is fabricated such that the polyamide yarns of the outer plies run in the longitudinal direction of the belt, while the polyester yarns lie in the transverse direction of the belt. Rubber covers are also provided in this embodiment.

DESCRIPTION OF SPECIFIC EMBODIMENTS

It will be appreciated that the present invention can take many forms and embodiments. Some embodiments of the invention are described so as to give an understanding of the invention. The embodiments herein described are intended to illustrate, and not to limit, the invention.

Figure 1:
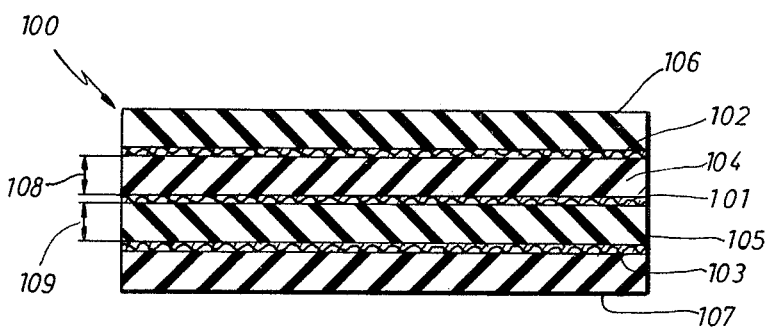
FIG. 1 is a cross sectional view of belting in accordance with the present invention.

With reference now to FIG. 1, there is illustrated belting 100 in accordance with the present invention. As shown, the belting 100 includes a center play 101, which comprises a fabric of a first synthetic material. The belting 100 also comprises outer plies 102 and 103 which are disposed in spaced relationship to the center ply 101 on opposite sides of the center ply 101. Each outer ply 102, 103 comprises a second synthetic fabric whose modulus and flex fatique life are both greater than the modulus and flex fatique life of the synthetic fabric of the center ply 101.

Interposed between the center ply 101 and the outer ply 102 is a rubber skim 104 having a thickness 108. A rubber skim 105 is interposed between the center ply 101 and the outer ply 103, and the rubber skim 105 has a thickness 109. Preferably, the thickness 108 of the rubber skim 104 is substantially the same as the thickness 109 of the rubber skim 105. As described below, the rubber skim 104 is bonded to the center ply 101 and to the outer ply 102, and the rubber skim 105 is bonded to the center ply 101 and the outer ply 103.

Still referring to FIG. 1, the belting 100 also includes rubber covers 106 and 107, which are bonded to the outer plies of 102 and 103, respectively. The rubber covers 106 and 107 provide abrasion resistance for the belting and a surface of the belting for engagement in operation.

According to conventional techniques, the fabric of the center ply 101 and the fabrics of the outer plies 102 and 103 are primed with Resorcinol Formaldehyde Latex (RFL). The belting is then "plied up", whereby the uncured rubber skims 104, 105 and rubber covers 106, 107 are placed in the positions shown in FIG. 1. The belting is then vulcanized, and the RFL is a chemical which causes bonding between the fabrics and the rubber skims and covers during vulcanization. The belting material may then be cut to appropriate lengths and widths.

Figure 3A:
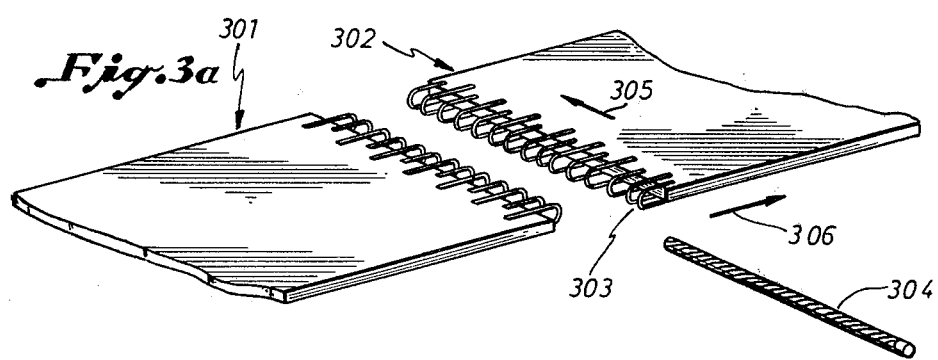
FIGS. 3a and 3b are perspective views of belting which illustrate a type of splice which has commonly been used on belting in agricultural applications.
Figure 3B:
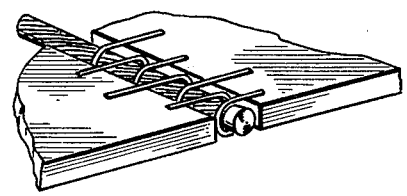

The ends of the belting may then be spliced together by using known techniques. One such technique is illustrated in FIGS. 3a and 3b, which is known as the so-called "clipper lace" splice technique. With this technique, a plurality of metal eyelets or hooks 303 are connected in each end of the belting, and a rod 304 or other suitable retaining material is passed through the eyelets. The ends of rod 304 are suitably formed to prevent removal of the rod and to thereby keep the splice intact.

Figure 2:
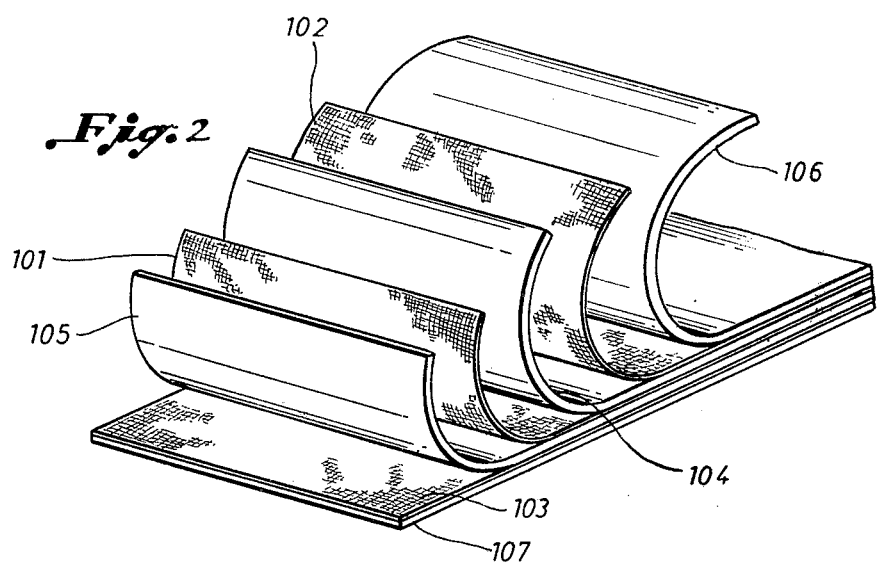
FIG. 2 is a perspective view of belting in accordance with the present invention.

With reference now to FIGS. 1 and 2, in one embodiment of the belting 100 of the present invention, the center ply 101 comprises a polyester fabric and each outer ply 102, 103 comprises a polyamide fabric. In this embodiment, the polyester fabric is preferably Type 1W73 or 1W74, which is available from Allied Chemical Company. The polyamide fabric of the outer plies 102, 103 is preferably type 728 Nylon*, which is available from DuPont.

Figure 4:
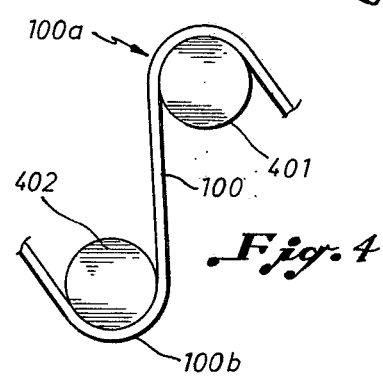
FIG. 4 is a pictorial drawing which illustrates the flexing to which belts are subjected in round hay balers.

With reference now to FIG. 4, when the belting 100 is installed on round hay balers, it is required to travel in S-shape configurations as shown in FIG. 4. Since the rubber skims 104, 105 are of substantially the same thickness, the center line of the load is maintained substantially on the center ply 101. Minimal flexing of the center ply 101 is thus achieved.

When the belting 100 travels around the roller 401, the outer ply closest to side 100a of the belting is flexed more than the outer ply closes to side 100b of the belting. Conversely, when the belting 100 travels around roller 402, the outer ply closest to side 100b is flexed more than the outer ply closest to side 100a of the belting. By using polyamide fabrics as the outer plies of belting of the present invention, the outer plies are able to flex without cracking as they travel around rollers as shown in FIG. 4. Additionally, the fabric of the outer plies 102, 103 has a sufficient flex fatique life to be able to hold the clipper lace splice (FIGS. 3a and 3b) without cracking.

In another embodiment of belting according to the present invention, the center ply 101 comprises a polyester fabric, while each outer ply 102, 103 comprises a fabric having polyamide yarns in the longitudinal direction 306 (FIG. 3) of the belt, while having polyester yarns in the transverse direction 305 (FIG. 3) of the belt. This embodiment has been found to be especially useful in situations where it is desired to reduce the weight of the center ply 101, while still meeting loading requirements. With longitudinal yarns of polyamide, the belting 100 is still able to flex without cracking. However, the transverse yarns of polyester in the outer plies 102, 103 reduce the elongation modulus of the belting.

Belting in accordance with the present invention may be either cut-edge or capped-edge belting. With cut-edge belting, the fabrics of the plies are exposed along edges 307 and 308 (FIG. 3a) of the belt. With capped-edge belting, a "cap" of rubber material is bonded to edges 307 and 308.

The foregoing description of the belting provided to comply with the requirements of the Patent Statute. Those skilled in the art, having the benefit of the present specification, may develop modifications to the invention, without departing from the scope of spirit of the invention. The appended claims are intended to cover such modifications.

What is claimed is:

1. Three-ply belting material, comprising:
   a center ply comprising a first synthetic fabric;
   first and second outer plies which are disposed in spaced relationship to the center ply on opposite sides of the center ply, each outer ply comprising a second synthetic fabric, the second synthetic fabric having a flex fatique life and a modulus which are respectively greater than the flex fatique life and modulus of the first synthetic fabric;
   a first rubber skim, which is interposed between the center ply and the first outer ply and which is bonded to the center ply and the first outer ply;
   a second rubber skim which is interposed between the center ply and the second outer ply and which is bonded to the center ply and the second outer ply, the thicknesses of the first and second rubber skims being substantially the same; and
   first and second rubber covers which are bonded to the first and second outer plies, respectively.

2. The belting of claim 1, wherein the center ply comprises a polyester fabric and wherein each outer ply comprises a polyamide fabric.

3. The belting of claim 1, wherein the center ply comprises a polyester fabric and wherein each outer ply comprises a fabric which is woven with polyamide yarns in one direction and polyester yarns in the other direction.

4. The belting of claim 3, wherein each outer ply comprises a fabric woven with polyamide yarns in the longitudinal direction of the belt and polyester yarns in the transverse direction of the belt.

5. The belting of claim 1, claim 2, claim 3 or claim 4, wherein the belting is cut-edge belting.

6. The belting of either claim 1, claim 2, claim 3 or claim 4, wherein the belting is capped-edge belting.

7. Three-ply belting material, comprising:
   a center ply comprising a polyester fabric;
   first and second outer plies which are disposed in spaced relationship to the center ply on opposite sides of the center ply, each outer ply comprising a polyamide fabric;
   a first rubber skim which is interposed between the center ply and the first outer ply and which is bonded to the center ply and the first outer ply;
   a second rubber skim which is interposed between the center ply and the second outer ply and which is bonded to the center ply and the second outer ply, the thicknesses of the first and second rubber skims being substantially the same; and
   first and econd rubber covers which are bonded to the first and second outer plies, respectively.

8. Three-ply belting material, comprising:
   a center ply comprising a polyester fabric;
   first and second outer plies which are disposed in spaced relationship to the center ply on opposite sides of the center ply, each outer ply comprising a fabric which is woven with polyamide yarns in one direction and polyester yarns in the other direction;
   a first rubber skim which is interposed between the center ply and the first outer ply and which is bonded to the center ply and the first outer ply;
   a second rubber skim which is interposed between the center ply and the second outer ply and which is bonded to the center ply and the second outer ply, the thicknesses of the first and second rubber skims being substantially the same; and
   first and second rubber covers which are bonded to the first and second outer plies, respectively.

9. The belting of claim 8, wherein each outer ply comprises a fabric with polyamide yarns in the longitudinal direction of the belt and polyester yarns in the transverse direction of the belt.

10. In a hay baler, three-ply belting material comprising:
    a center ply comprising a first synthetic fabric;
    first and second outer plies which are disposed in spaced relationship to the center ply on opposite sides of the center ply, each outer ply comprising a second synthetic fabric, the second synthetic fabric having a flex fatique life and a modulus which are respectively greater than the flex fatique life and modulus of the first synthetic fabric;
    a first rubber skim, which is interposed between the center ply and the first outer ply and which is bonded to the center ply and the first outer ply;
    a second rubber skim which is interposed between the center ply and the second outer ply and which is bonded to the center ply and the second outer ply, the thicknesses of the first and second rubber skims being substantially the same; and
    first and second rubbers covers which are bonded to the first and second outer plies, respectively.

11. In a hay baler, three-ply belting material comprising:
    a center ply comprising a polyester fabric;
    first and second outer plies which are disposed in spaced relationship to the center ply on opposite sides of the center ply, each outer ply comprising a polyamide fabric;
    a first rubber skim which is interposed between the center ply and the first outer ply and which is bonded to the center ply and the first outer ply;
    a second rubber skim which is interposed between the center ply and the second outer ply and which is bonded to the center ply and the second outer ply, the thicknesses of the first and second rubber skims being substantially the same; and
    first and second rubber covers which are bonded to the first and second outer plies, respectively.

12. In a hay baler, three-ply belting material comprising:
- a center ply comprising a polyester fabric;
- first and second outer plies which are disposed in spaced relationship to the center ply on opposite sides of the center ply, each outer ply comprising a fabric which is woven with polyamide yarns in one direction and polyester yarns in the other direction;
- a first rubber skim which is interposed between the center ply and the first outer ply and which is bonded to the center ply and the first outer ply;
- a second rubber skim which is interposed between the center ply and the second outer ply and which is bonded to the center ply and the second outer ply, the thicknesses of the first and second rubber skims being substantially the same; and
- first and second rubber covers which are bonded to the first and second outer plies, respectively.

13. The belting of claim 12, wherein each outer ply comprises a fabric with polyamide yarns in the longitudinal direction of the belt and polyester yarns in the transverse direction of the belt.

* * * * *